No. 814,736. PATENTED MAR. 13, 1906.
J. T. SCOTT.
MACHINE FOR BALING VINES, HAY, AND THE LIKE IN CYLINDRICAL FORM.
APPLICATION FILED MAY 12, 1905.
2 SHEETS—SHEET 1.
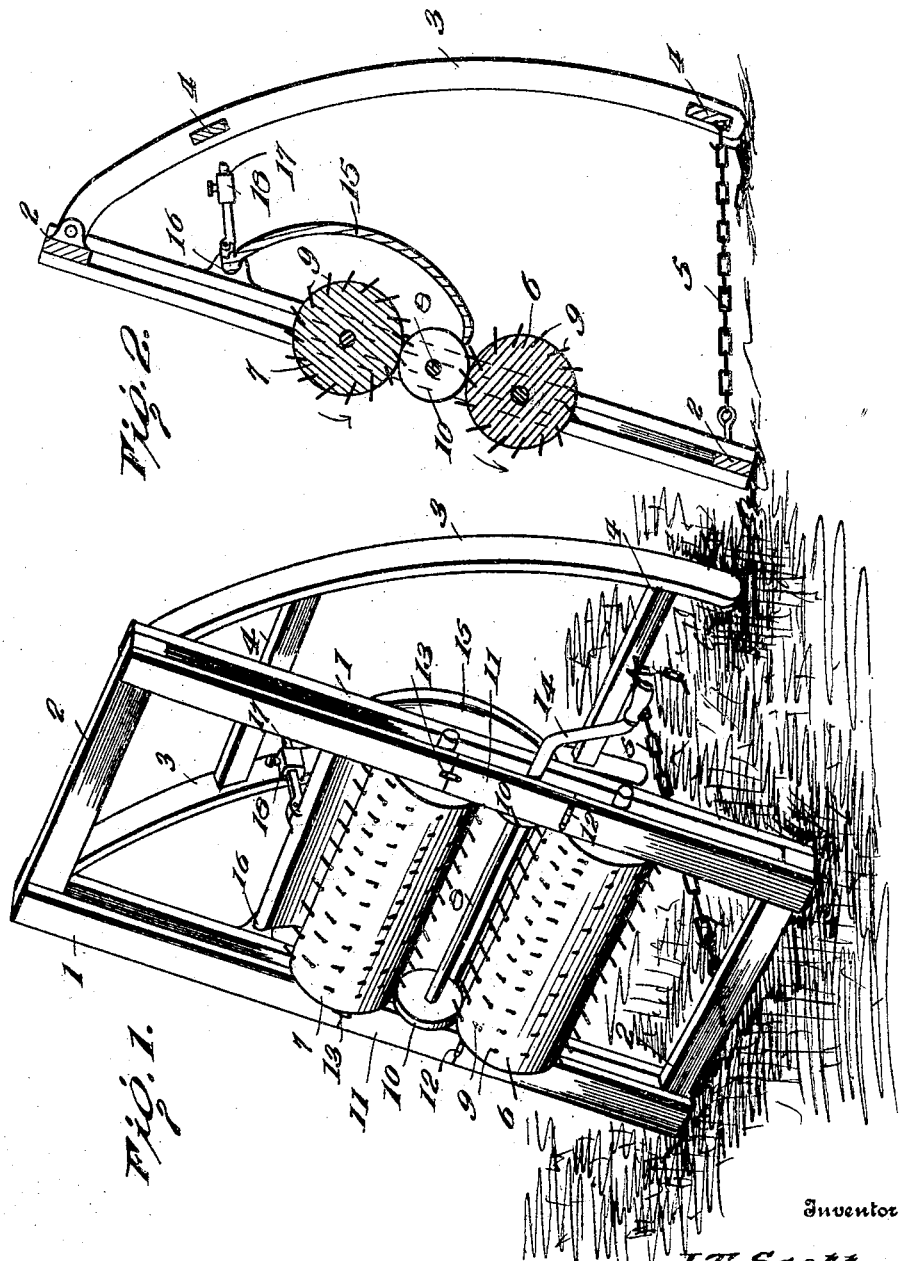
Inventor
J. T. Scott
Witnesses
By
R. A. R. Lacey, Attorneys No. 814,736. PATENTED MAR. 13, 1906.
J. T. SCOTT.
MACHINE FOR BALING VINES, HAY, AND THE LIKE IN CYLINDRICAL FORM.
APPLICATION FILED MAY 12, 1905.
2 SHEETS—SHEET 2.
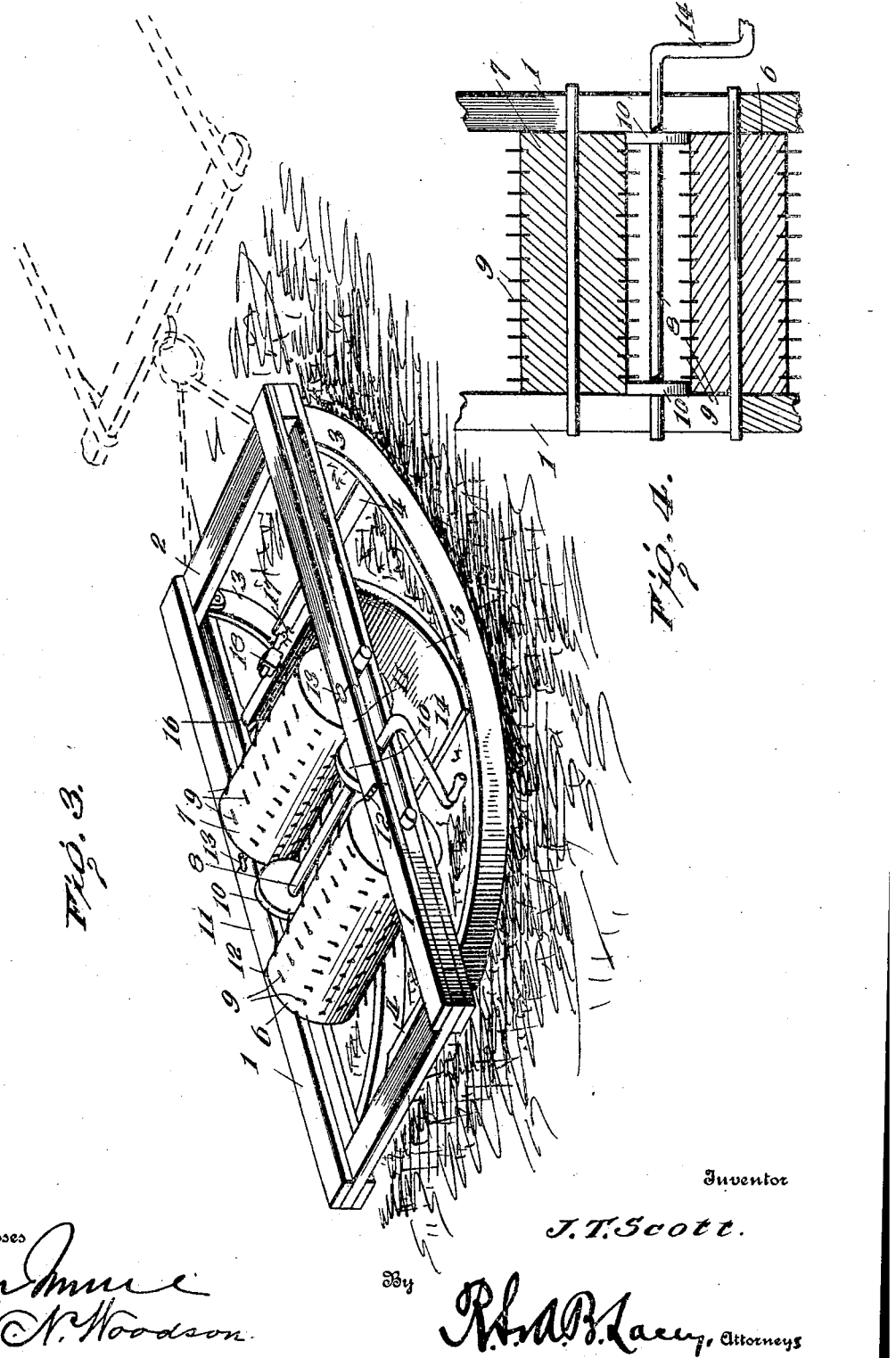
Inventor
J. T. Scott.
Witnesses
By
R. S. & A. B. Lacey, Attorneys

UNITED STATES PATENT OFFICE.

JOHN T. SCOTT, OF SIMPSONVILLE, TEXAS.

MACHINE FOR BALING VINES, HAY, AND THE LIKE IN CYLINDRICAL FORM.

No. 814,736.

Specification of Letters Patent.

Patented March 13, 1906.

Application filed May 12, 1905. Serial No. 260,182.

*To all whom it may concern:*

Be it known that I, JOHN T. SCOTT, a citizen of the United States, residing at Simpsonville, in the county of Upshur and State of Texas, have invented certain new and useful Improvements in Machines for Baling Vines, Hay, and the Like in Cylindrical Form, of which the following is a specification.

This invention provides a machine which may be advantageously used in the field for baling edible fibrous material, whether cured or green, the bale having an opening through which air may freely circulate, thereby preventing molding of the material if baled in a green state or before thoroughly cured.

The machine is of such structure that it occupies a comparatively small space and may be transported from place to place on runners, the latter also forming a brace for sustaining the machine in working position. A weighted roller compresses the material, and its effectiveness may be regulated by moving the frame so as to occupy a more or less inclination to the perpendicular.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment is shown in the accompanying drawings, in which—

Figure 1 is a perspective view of a baling-machine embodying the invention. Fig. 2 is a vertical central transverse section thereof. Fig. 3 is a perspective view of the machine as it appears when the brace is folded to provide runners upon which the machine is supported during transportation. Fig. 4 is a sectional detail of the rollers and their support.

Corresponding and like parts are referred to in the following description and indicated in all the views of the drawings by the same reference characters.

The frame for supporting the baling mechanism comprises side pieces 1 and connecting end or cross pieces 2. The side pieces 1 constitute guides, and each is preferably formed of companion bars or strips spaced apart so as to receive between them the journals of the rollers. The frame is supported in an upright position by means of a brace which is composed of bars 3 and cross-pieces 4. The bars 3 are longitudinally curved so as to provide runners when the machine is in folded position for transportation, as shown most clearly in Fig. 3. The brace may be adjusted so as to vary the inclination of the main frame, whereby the effectiveness of the compressing-roller may be regulated. As shown, a chain 5 is provided for adjustably connecting the lower ends of the main arms and braces when the machine is set up for use.

The baling mechanism comprises a bed-roller 6, a compressing-roller 7, and a spindle 8, each of said parts having its journals mounted in the side pieces of the main frame. The bed-roller 6 occupies a relatively fixed position, whereas the spindle 8 and compressing-rollers 7 are movable vertically to adapt themselves to the increasing size of the bale during its formation. The compressing-roller 7 is either constructed of metal or weighted in any manner so as to exert a pressure upon the material and insure its compact wind upon the spindle 8 during the process of baling. Both the bed and the compressing rollers are formed with teeth 9, which are obliquely disposed, so as to act as packers in compressing the material as the same is supplied to the spindle. The spindle 8 is detachably fitted to the main frame, so as to be removed after the bale has reached the required size. Disks 10 are fitted to end portions of the spindle to confine the ends of the bale and prevent the material wedging between the ends of the rollers 6 and 7 and their supporting side pieces. To admit of removal and replacement of the spindle, a portion 11 of the upper or outer bar of each side piece is cut therefrom and hinged at one end, as shown at 12, and adapted to be secured at the opposite end by a suitable catch 13. Any means may be employed for rotating the spindle 8, and, as shown, it is provided with a crank-handle 14.

A deflector 15 is arranged in the rear of the baling mechanism and comprises a curved plate hinged at its upper end, as shown at 16, and free to spring at its lower end, which is curved toward the baling mechanism, so as to direct the material around the spindle 8. An arm 17 projects rearward from the upper end of the deflector 15 and is provided with a weight 18, adjustable thereon, whereby the effectiveness of the deflector may be adjusted. The arm 17 is preferably hinged to the deflector 15 to admit of its folding out of the way when the machine is arranged for transportation.

When the baling-machine is set up, the material to be baled is fed into the space between the compressing-roller 7 and the spindle 8 and is directed forward around the spindle 8 by coming in contact with the deflector 15, said deflector also serving to compress the material in the formation of the bale. The teeth 9 are so inclined as to materially assist in the compressing of the material and at the same time to clear the material without dragging it from the spindle. Some material will stand a greater degree of compression than others, and by varying the inclination of the main frame to the perpendicular the effectiveness of the compressing-roller 7 may be adjusted, as will be readily comprehended.

When it is required to transport the machine, it is folded upon the brace and turned into an approximately horizontal position, as shown in Fig. 3, said brace serving as runners for the machine to travel on when drawn over the field or road.

Having thus described the invention, what is claimed as new is—

1. A baling-machine comprising a bed-roller, a spindle, and a compressing-roller, the latter being weighted and adapted to have its effectiveness regulated by inclining the frame more or less to the perpendicular.

2. In a cylindrical baling-machine, the combination of bale-forming rollers, a spindle about which the material is wrapped, and packers fitted to one or more of said bale-forming rollers to materially assist in compressing the material during the formation of the bale, substantially as set forth.

3. In a cylindrical bale-forming machine, the combination of bale-forming rollers, a spindle about which the material is wound, a deflector for directing the material around said spindle, an arm hingedly connected with said deflector, and a weight mounted upon said arm.

4. In combination, a frame, a baling mechanism mounted thereon, and a brace for supporting said frame in operative position and constituting a runner upon which the machine glides when drawn from one place to another.

5. In combination, a frame, a baling mechanism mounted thereon, and a brace for sustaining the frame in an upright position and comprising longitudinally-curved bars, said bars having hinged connection with the frame and adapted to be used as runners for supporting the machine when moved from one place to another.

In testimony whereof I affix my signature in presence of two witnesses.

JOHN T. SCOTT. [L. S.]

Witnesses:
JAMES C. HUEY,
REUBEN A. COPE.